United States Patent
Abe (10) Patent No.: US 8,004,592 B2
(45) Date of Patent: Aug. 23, 2011

(54) IMAGING DEVICE, THROUGH IMAGE DISPLAY CONTROL METHOD, AND RECORDING MEDIUM ON WHICH THROUGH IMAGE DISPLAY CONTROL PROGRAM IS RECORDED IN COMPUTER-READABLE MANNER

(75) Inventor: Yoshinori Abe, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 1018 days.

(21) Appl. No.: 11/823,044

(22) Filed: Jun. 26, 2007

(65) Prior Publication Data

US 2008/0007631 A1 Jan. 10, 2008

(30) Foreign Application Priority Data

Jul. 7, 2006 (JP) ................................. 2006-187308

(51) Int. Cl.
*H04N 5/222* (2006.01)
(52) U.S. Cl. .............................. 348/333.02; 348/333.05
(58) Field of Classification Search . 348/333.01–333.05
See application file for complete search history.

(56) References Cited

U.S. PATENT DOCUMENTS

| 7,098,946 | B1 | 8/2006 | Koseki et al. | |
|---|---|---|---|---|
| 2005/0219384 | A1* | 10/2005 | Herberger et al. | ............ 348/239 |

FOREIGN PATENT DOCUMENTS

| JP | 11-168689 A | 6/1999 |
|---|---|---|
| JP | 2000-092378 A | 3/2000 |
| JP | 2004-312162 A | 11/2004 |
| JP | 2005-176216 A | 6/2005 |

OTHER PUBLICATIONS

Korean Office Action (and English translation thereof) dated Apr. 26, 2008, issued in a counterpart Korean Application.
Japanese Office Action dated Mar. 29, 2011 (and English translation thereof) in counterpart Japanese Application No. 2006-187308.

* cited by examiner

*Primary Examiner* — Kelly L Jerabek
(74) *Attorney, Agent, or Firm* — Holtz, Holtz, Goodman & Chick, PC (57) ABSTRACT

A template storage section previously stores a template having a plurality of display areas. A template readout section reads out the template from the template storage section for display. An imaging section images a subject and outputs corresponding image data. A through image display control section displays a through image corresponding to image data output by the imaging section in one of the display areas included in the template that has been read out by the template readout section. The through image display control section switches the display area of the through image from one area to remaining areas based on an instruction from a user.

5 Claims, 5 Drawing Sheets

IMAGING DEVICE, THROUGH IMAGE DISPLAY CONTROL METHOD, AND RECORDING MEDIUM ON WHICH THROUGH IMAGE DISPLAY CONTROL PROGRAM IS RECORDED IN COMPUTER-READABLE MANNER

BACKGROUND OF THE INVENTION

1. Field of the Invention

The present invention relates to an imaging device which displays a through image so as to be suitable for a template while imaging a subject, a through image display control method, and a recording medium on which a through image display control program is recorded in a computer-readable manner.

2. Description of the Related Art

There is proposed a digital camera capable of laying out a picked up image in a desirable position so as to record them. For example, when a user uses this digital camera to create a layout image, he or she first sets, e.g., an album mode and then selects a desirable template from a plurality of templates that have previously been prepared. Subsequently, the user selects a given image to be inserted into the template from picked up images which have been stored therein. Then, the selected image is inserted into the template and stored in a recording medium. In this manner, a layout image in which a desirable image has been inserted into a template is created in the digital camera (refer to, e.g., Unexamined Japanese Patent Application KOKAI Publication No. 2005-176216).

As described above, in a conventional digital camera, a user first picks up a subject and records it and, after an appropriate time period, he or she selects a desired image from a plurality of images that have been already recorded. Thus, the user is forced to do cumbersome works of not only imaging a subject so as to record it and selecting a desired image from a large number of recorded images, but also selecting an adequate image while imaging a layout to be obtained by combining a frame and a picked up image or a relationship between images to be combined. As described above, the user is forced to do cumbersome or difficult works and, consequently, it has been impossible to easily obtain a desired layout image.

SUMMARY OF THE INVENTION

The present invention has been made in view of the problem involved in the prior art, and an object thereof is to provide an imaging device capable of easily creating a layout image in which an image has been inserted into a template, a through image display control method, and a through image display control program.

According to a preferred embodiment of the present invention, there is provided an imaging device comprising:

a template storage section which previously stores a template having a plurality of display areas;

a template readout section which reads out the template from the template storage section;

an imaging section which images a subject and outputs corresponding image data; and a through image display control section which displays a through image corresponding to image data output by the imaging section in one of the display areas included in the template that has been read out by the template readout section and switches the display area of the through image from one area to another.

According to a preferred embodiment of the present invention, there is provided a through image display control method in an imaging device comprising a template storage section which previously stores a template having a plurality of display areas and an imaging section which images a subject, comprising:

a template readout step of reading out the template from the template storage section; and a through image display step of displaying a through image corresponding to image data output by the imaging section in one of the display areas included in the template that has been read out by the template readout step and switching the display area of the through image from one area to another based on an instruction from a user.

According to a preferred embodiment of the present invention, there is provided a recording medium storing, in a computer-readable manner, a through image display control program which allows a computer to execute:

a template readout function of reading out a template having a plurality of display areas from a storage section; and a through image display control function of displaying a through image corresponding to image data output by an imaging section in one of the display areas included in the template that has been read out by the template readout function and switching the display area of the through image from one area to another based on an instruction from a user.

An imaging device according to the present invention displays a through image in one of display areas on a set template and switches the display area of the through image from one area to another. Thus, at the image pickup time, a user can visually confirm a layout image including the template and images displayed in respective display areas on the template. The imaging device records the layout image data including the set template and preview images that are displayed in the display areas on the template by a predetermined instruction made by a user in a recording medium. A user can easily create a layout image into which a desired image has been put.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Embodiments of the present invention will be described below with reference to the accompanying drawings.

First Embodiment

Figure 1:
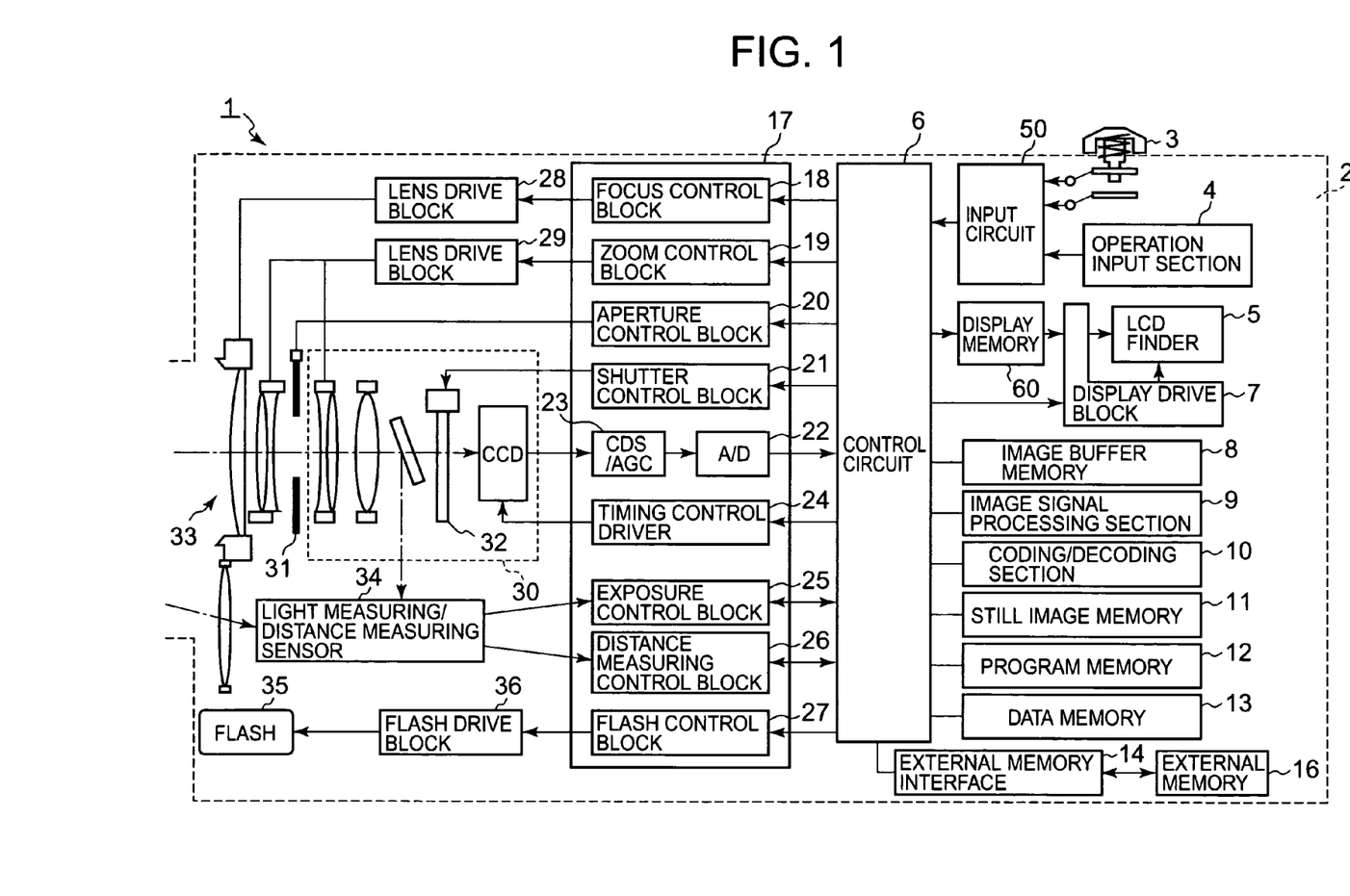
FIG. 1 is a block diagram showing a circuit configuration of a digital camera 1 according to an embodiment of the present invention.

FIG. 1 is a block diagram showing a circuit configuration of a digital camera 1 according to an embodiment of the present invention. As shown in FIG. 1, a shatter key 3 is provided in a main body 2 of the digital camera 1. The shatter key 3 is connected to an operation input section 4 and an input circuit 50. The operation input section 4 includes switches, such as a mode switch, to be described later. Operation information and ON/OFF information from respective switches are given to a control circuit 6 through an input circuit 50. The control circuit 6, which is constituted by a microcomputer comprising a CPU, a peripheral circuit of the CPU, a RAM serving as a working memory for the CPU, and the like, controls respective components in the digital camera 1.

To the control circuit 6, a display memory 60, a display drive block 7, an image buffer memory 8, an image signal processing section 9, a coding (compression)/decoding (expansion) section 10, a still image memory 11, a program memory 12, a data memory 13, and an external memory interface 14 are connected. The display memory 60 temporarily stores various display data to be displayed on an LCD (Liquid Crystal Display) finder 5. The display drive block 7 drives the LCD finder 5. The image buffer memory 8 temporarily stores image data when the image data is subjected to predetermined image processing.

The image signal processing section 9 is a DSP (Digital Signal Processor) that applies various image processing to an image signal that the control circuit 6 loads from an image sensor to be described later. The coding/decoding section 10 compresses (codes) the image data processed by the image signal processing section 9 at recording time and expands (decodes) the recorded image data at reproduction time. The still image memory 11 stores image data (still image data) picked up by the operation of the shutter key 3. The program memory 12 stores a control program of the control circuit 6 shown in a flowchart to be described later, and data memory 13 previously stores a plurality of types of templates to be described later. The external memory interface 14 is connected to a detachable external memory 16.

Further, a photographing control block 17 is connected to the control circuit 6. To the photographing control block 17, a focus control block 18, a zoom control block 19, an aperture control block 20, a shutter control block 21, an A/D (Analog/Digital converter) circuit 22, a CDS/AGC (Correlated Double Sampling/Analog Gain Controlling) circuit 23, a timing control driver 24, an exposure control block 25, a distance measuring control block 26, and a flash control block 27 are connected. The focus control block 18 controls a lens drive block 28 for driving an image pickup lens 33 in order for a subject image to be focused. The zoom control block 19 controls a lens drive block 29 for driving the image pickup lens 33 so as to enlarge or reduce a subject image in response to an instruction from a user.

The aperture control block 20 controls an aperture 31 disposed between the image pickup lens 33 and an image sensor 30 including a CCD (Charge Coupled Device). The shutter control block 21 controls a shutter 32 disposed in image sensor 30. The A/D circuit 22 converts an analog signal which is input thereto from the image sensor 30 through the CDS/AGC 23 into a digital signal. The timing control driver 24 generates a timing signal to drive the image sensor 30 and CDS/AGC 23. The CDS/AGC 23 is constituted by a CDS for retaining a image pickup signal output from the image sensor 30 and an analog gain control amplifier (AGC) for receiving an image pickup signal from the CDS. The exposure control block 25 controls a light measuring/distance measuring sensor 34 and inputs a light measuring signal supplied from the light measuring/distance measuring sensor 34 to the control circuit 6. The distance measuring control block 26 inputs a distance measuring signal to the control circuit 6. The flash control block 27 controls a flash drive block 36 for driving a flash 35.

Figure 2A:
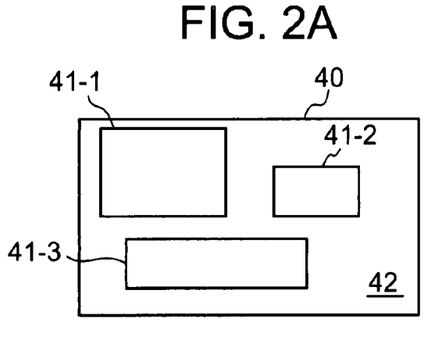
FIG. 2A is a view showing an example of a template.

The data memory 13 stores a plurality of types of templates 40, an example of which is shown in FIG. 2A. The template 40 is image data composed of a display area 41 and a masking area 42 surrounding the display area 41. In the case where a plurality of display areas 41 are included in the template 40, serial numbers starting from 1 (initial value) are assigned to the respective display areas 41. For example, the template 40 shown in FIG. 2A has a first display area 41-1 and a second display area 41-2 in its upper portion and a third display area 41-3 in its lower potion. That is, a plurality of templates 40 which are different from one another in terms of the number of display areas 41, layout, or design are stored in the data memory 13.

Figure 3:
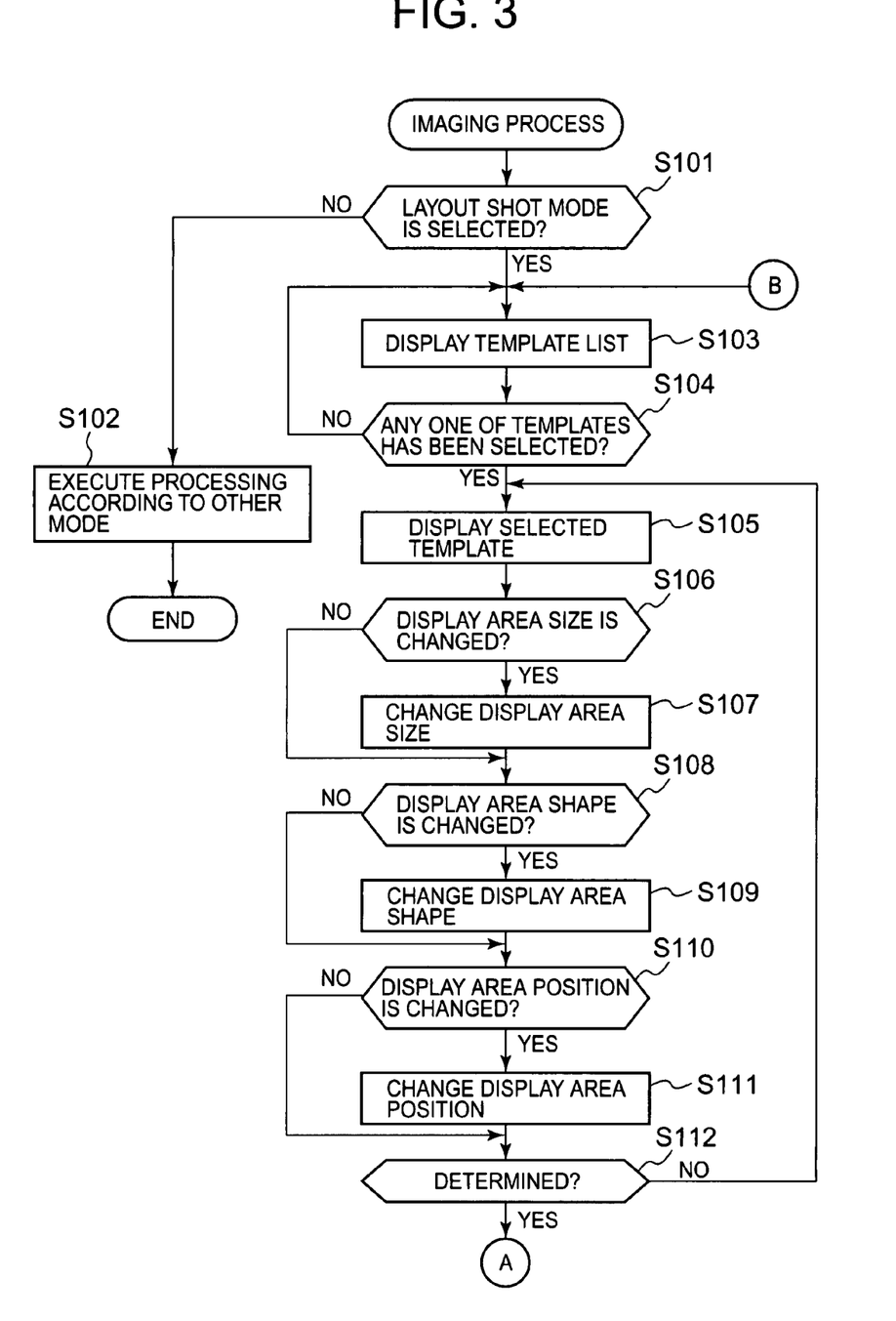
FIG. 3 is a flowchart showing a part of the processing procedure in the first embodiment of the present invention.
Figure 4:
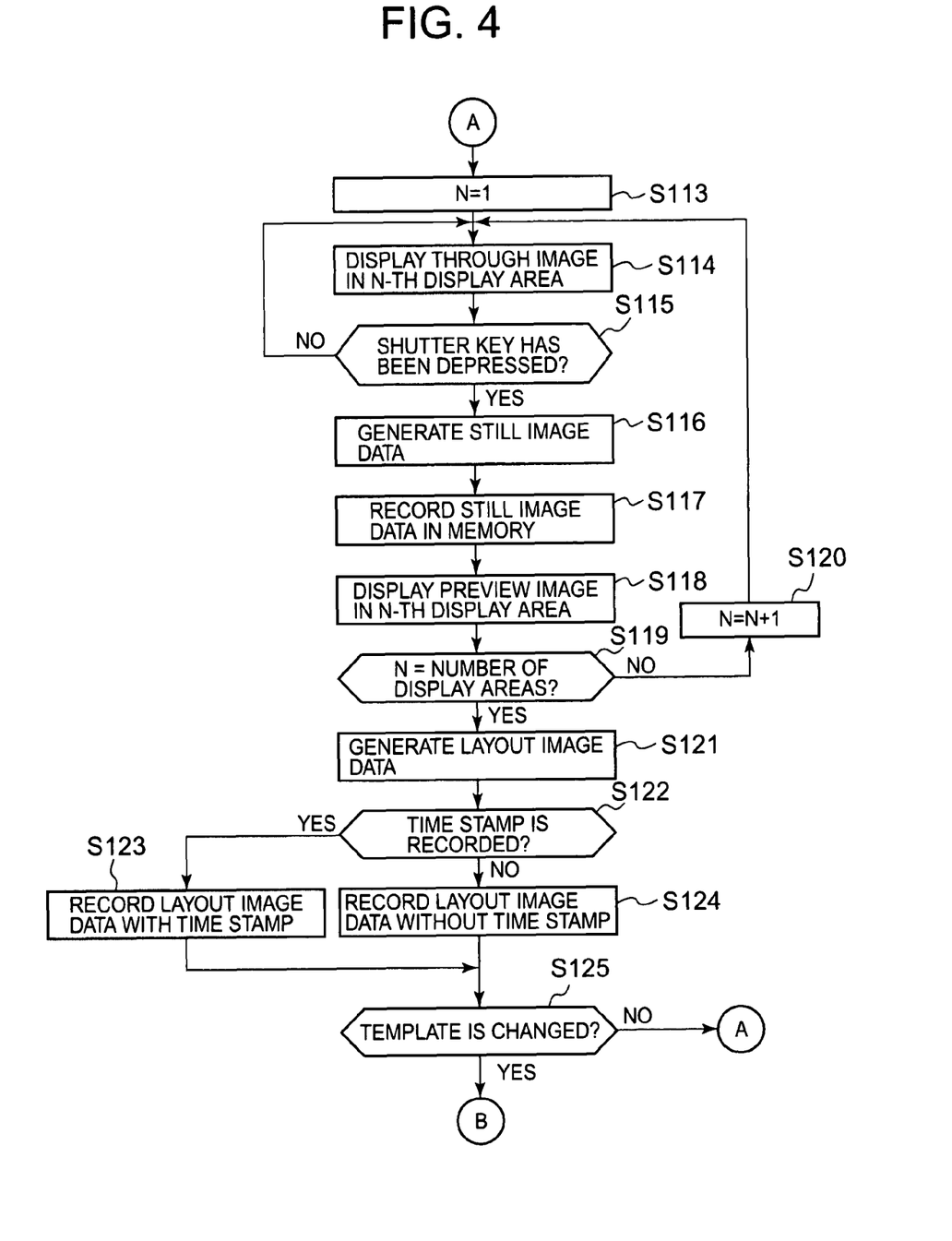
FIG. 4 is a flowchart continued from FIG. 3 in the first embodiment of the present invention.

In the present embodiment described above, the control circuit 6 executes predetermined processing according to flowcharts shown in FIGS. 3 and 4 based on a program stored in the program memory 12.

The digital camera 1 according to the present embodiment is provided with a plurality of photographing modes. Examples of the photographing mode include a layout shot mode in which a user picks up a subject while using the template 40 and a normal photographing mode in which a user picks up a subject without using the template 40. The user operates a mode switch provided in the operation input section 4 to thereby freely set a desired photographing mode.

The operation input section 4 receives an input for selecting the photographing mode from a user. The control circuit 6 determines whether the layout shot mode is set (step S101). If the layout shot mode is not set (NO in step S101), the control circuit 6 executes processing according to the other mode such as a normal photographing mode (step S102).

If the layout shot mode is set (YES in S101), the control circuit 6 displays a list of the templates 40 stored in the data memory 13 on the LCD finder 5 (step S103). For example, the plurality of templates 40 is displayed in a thumbnail view. Then, the operation input section 4 receives an input for selecting a given template 40 from a user. The control circuit 6 determines whether any one of the displayed templates 40 has been selected (step S104). If determining that any one of the templates 40 has been selected, (YES in step S104), the control circuit 6 displays only the selected one on the LCD finder 5 (step S105). The processing in step S105 allows the template 40 having one or more display areas 41 to be displayed on the entire screen of the LCD finder 5. For example, as shown in FIG. 2A, the template 40 has three display areas 41, i.e., first to third display areas 41-1 to 41-3.

Then, the operation input section 4 receives an input for changing the size of the display area 41 from a user. The control circuit 6 determines whether an instruction for changing the size has been made (step S106). If determining that the instruction has been made (YES in step S106), the control circuit 6 changes the size of the display area 41 according to the instruction input (step S107).

Further, the operation input section 4 receives an input for changing the shape of the display area 41 from a user. The control circuit 6 determines whether an instruction for changing the shape has been made (step S108). If determining that the instruction has been made (YES in step S108), the control circuit 6 changes the shape of the display area 41 according to the instruction input (step S109).

Further, the operation input section 4 receives an input for changing the position of the display area 41 from a user. The control circuit 6 determines whether an instruction for changing the position has been made (step S110). If determining that the instruction has been made (YES in step S110), the control circuit 6 changes the position of the display area 41 according to the instruction input (step S111).

Through the processing in steps S106 to S111, the control circuit 6 can set the display area 41 in the template 40 selected by the user in step S104 to a user's desired size, shape, and position.

A number of templates 40 in which the size, shape, and position of the display area 41 are different from one another may previously be stored in the data memory 13. In this case, a user can set the template 40 by a single selection.

Figure 2B:
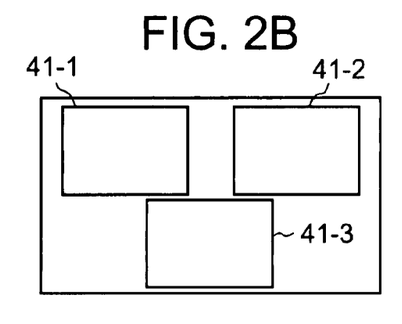
FIG. 2B is a view showing transition of an image displayed on an LCD finder, where a template is displayed.
Figure 2C:
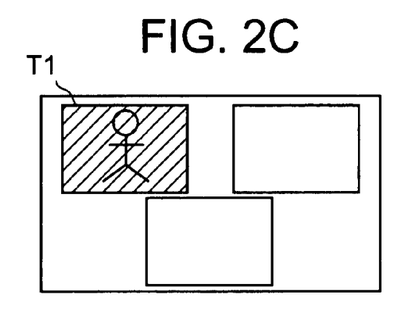
FIG. 2C is a view showing transition of an image displayed on an LCD finder, where a through image is displayed in a first area of the template.

Then, the operation input section 4 receives an input for determining the setting of the template 40. The control circuit 6 determines whether an instruction for determining the setting has been made (step S112). If determining that the instruction has been made (YES in step S112), the control circuit 6 advances to step S113 of FIG. 4. For example, as shown in FIG. 2B, a new template 40 obtained by changing the sizes, shapes, and positions of the second and third display areas 41-2 and 41-3 is displayed on the LCD finder 5. If determining that the instruction for determining the setting has not been made (NO in step S112), the control circuit 6 returns to step S105 from which the setting of the template 40 is repeated. The changing order of the template 40 is not limited to that according to the flowchart of FIG. 3. Further, the color of the template may be changed.

The control circuit 6 sets an initial value "1" in a counter N for specifying any one of the display areas 41 (step S113). The control circuit 6 displays a through image on a N-th display area 41-N specified by the counter N (step S114). The through image is an image that the image sensor 30 is currently capturing. As a matter of course, when displaying the through image, the control circuit 6 executes light measuring processing, white balance (WB) processing, AutoFocus (AF) processing, and the like. Assuming that N=1, as shown in, e.g., FIG. 2, a through image T1 that has been subjected to the WB processing and AF processing in the first display area 41-1. A shaded image in FIGS. 2C, 2D, 2E, 2F, 2G, or 2H represents a through image (T) while non-shaded image represents a still image (preview image (P)).

Figure 2D:
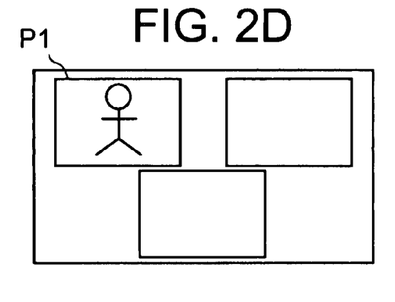
FIG. 2D is a view showing transition of an image displayed on an LCD finder, where a preview image is displayed in a first area of the template.

After displaying the N-th through image TN in the N-th display area 41-N, the control circuit 6 wais until the shutter key 3 is depressed (step S115). Meanwhile a user waits for a shutter chance while viewing the through image TN displayed in the N-th display area 41-N. When the shutter chance comes and the user depresses the shutter key 3, the control circuit 6 determines that the shutter key has been depressed (YES in S115). Then, the control circuit 6 stops displaying the through image and generates a still image based on image data corresponding to the through image TN that has been displayed on the N-th display area 41-N a at the time point when the shutter key 3 is depressed (step S116). The control circuit 6 stores the generated still image data in the image buffer memory 8 and records it in the still image memory 11 or external memory 16 (step S117). Further, based on the still image data, the control circuit 6 displays a review image in the N-th display area (step S118). Assuming that N=1, a preview image P1 is displayed in the first display area 41-1 in which the through image T1 was displayed until a while ago, as shown in FIG. 2D.

The control circuit 6 then determines whether N reaches a value corresponding to the total number of display areas (step S119). If determining that N is not equal to the total number (NO in step S119), the control circuit 6 counts up the counter N (step S120) and repeats the processing from step S114 to S119. In this example, the processing from step S114 to S119 is repeated by three times until N reaches 3.

Figure 2E:
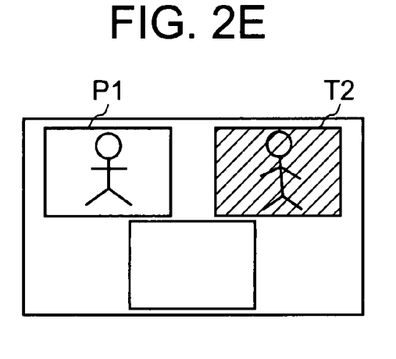
FIG. 2E is a view showing transition of an image displayed on an LCD finder, where a preview image is displayed in the first area of the template and through image is displayed in a second display area.
Figure 2F:
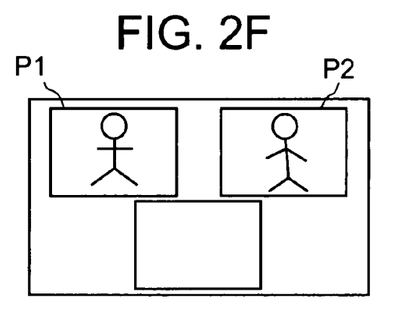
FIG. 2F is a view showing transition of an image displayed on an LCD finder, where preview images are displayed in the first and second areas of the template.

For example, at the time point when N=2, the preview image P1 is displayed in the first display area 41-1 and a through image T2 is displayed in the second display area 41-2 by the processing of step S114, as shown in FIG. 2E. Further, upon depression of he shutter key 3 in this state, the preview image P1 is displayed in the first display area 41-1 and a preview image P2 is displayed in the second display area 41-2, as shown in FIG. 2F.

Figure 2G:
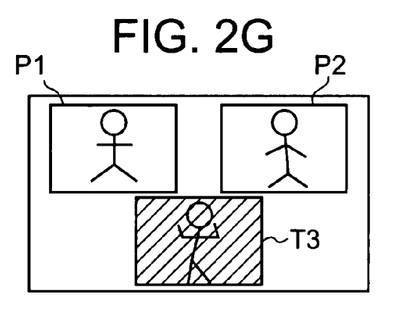
FIG. 2G is a view showing transition of an image displayed on an LCD finder, where preview images are displayed in the first and second areas of the template and through image is displayed in a third area.
Figure 2H:
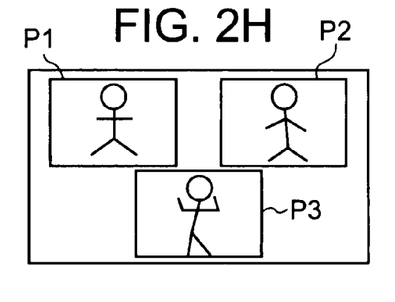
FIG. 2H is a view showing transition of an image displayed on an LCD finder, where preview images are displayed in the first, second, and third display areas of the template.

At the time point when N=3, the preview image P1 is displayed in the first display area 41-1, preview image P2 is displayed in the second display area 41-2, and a through image T3 is displayed in the third display area 41-3 by the processing of step S114, as shown in FIG. 2G. Further, upon depression of the shutter key 3 in this state, the preview image P1 is displayed in the first display area 41-1, preview image P2 is displayed in the second display area 41-2, and a preview image P3 is displayed in the third display area 41-3, as shown in FIG. 2H. Since all preview images have been imported in the respective display areas 41, the control circuit 6 stops displaying the through image.

At the same time, the three still image data corresponding to the three preview images P1, P2, P3 are stored in the image buffer memory 8 and still image memory 11 or the external memory 16.

When N reaches a value corresponding to the total number of display areas (YES in step S119), the control circuit 6 generates a layout image data (step S121). That is, as shown in FIG. 2H, the control circuit 6 generates layout image data in which preview images P1, P2, and P3 are displayed in the first to third display areas 41-1 to 41-3 on the template 40.

The operation input section 4 receives an input for specifying whether the image data is recorded with a time stamp added thereto. The time stamp is information indicating data and time at which the image data is acquired (images corresponding to the image data are picked up). The control circuit 6 then determines whether the time stamp is recorded (step S122). If determining that the time stamp is recorded (YES in step S122), the control circuit 6 records the layout image data generated in step S121 in the still image memory 11 or external memory 16 with the time stamp added thereto (step S123). If determining that the time stamp is not recorded (NO in step S122), the control circuit 6 records only the layout image data generated in step S121 in the still image memory 11 or external memory 16 (step S124).

The control circuit 6 then determines whether an instruction of changing the template 40 has been made by a user (step S125). If determining that there is no instruction of changing the template 40 (NO in step S125), the control circuit 6 returns to step S113, where a through image is displayed in the N-th display area 41-N again in step S114 and the abovementioned processing is repeated. On the other hand, if it is determined that an instruction of changing the template 40 has been made (YES in step S125), the control circuit 6 returns to step S101. If the layout shot mode is still active, the control circuit 6 executes the processing of step S103 and subsequent steps. If the layout shot mode is canceled, the control circuit 6 shifts to processing for another mode (step S102).

Although the though images and preview images are displayed in the first, second, and third display area in the order specified by the counter N in the present embodiment, these images may be displayed in the respective display areas in an arbitrary order specified by a user.

Second Embodiment

Figure 5:
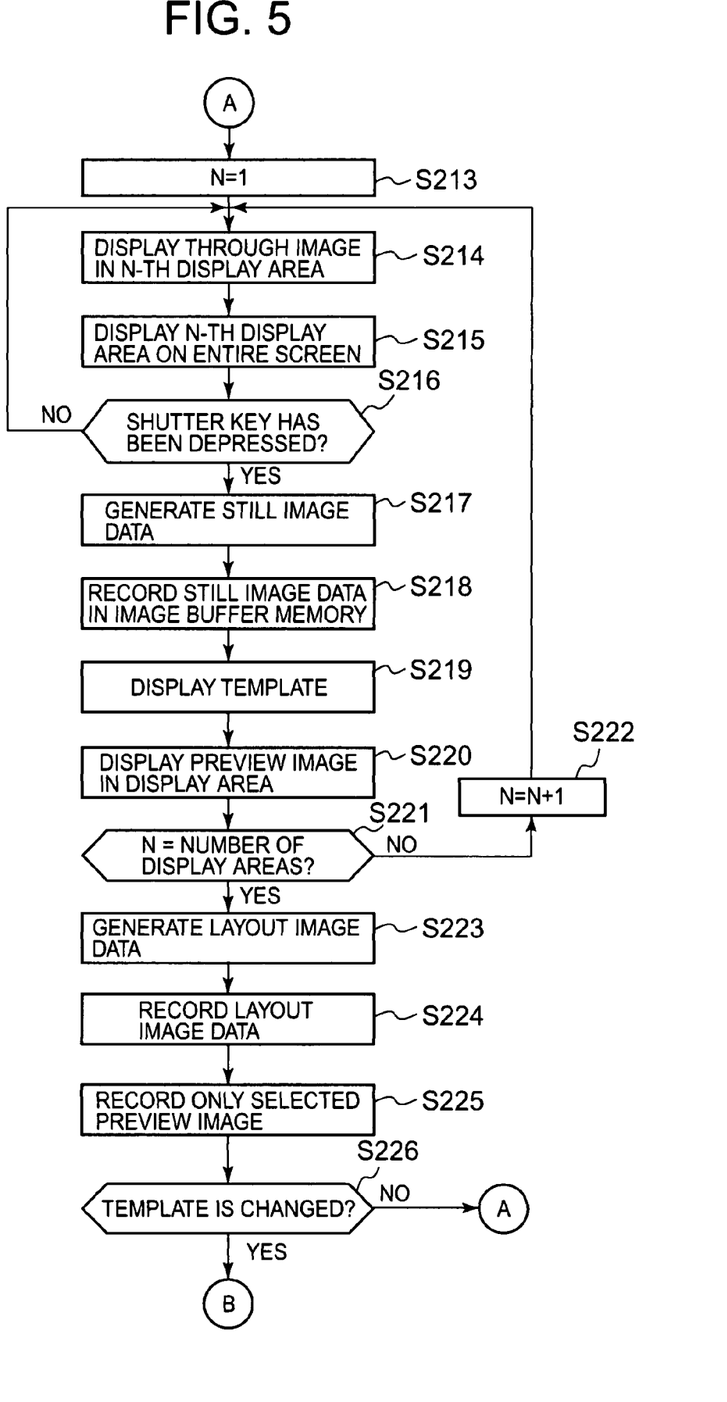
FIG. 5 is a flowchart showing a part of the processing procedure in a second embodiment of the present invention, the flowchart being continued from FIG. 3.

FIG. 5 is a flowchart showing the processing procedure in a second embodiment of the present invention. After execution of the abovementioned processing from step S101 to S112 according to the flowchart shown in FIG. 3, the control circuit 6 executes processing, based on a program stored in the program memory 12, starting from step S213 shown in FIG. 5.

More specifically, the control circuit 6 sets an initial value "1" in the counter N (step S213) and displays a through image in the N-th display area 41-N specified by the counter N (step S214). The control circuit 6 displays the display area 41-N in which the through image is displayed on the entire screen of the LCD finder 5 (step S215) and waits until the shutter key 3 is depressed (step S216).

Thus, in the present embodiment, a through image is displayed on the entire screen of the LCD finder 5 as in the case of normal image pickup operation during the time until the shutter key 3 is depressed by a user (i.e., during the time during which a user waits for a shutter chance). Therefore, a user can wait for a shutter chance while viewing a clear through image displayed on the entire screen as in case of a normal image pickup mode.

When the shutter chance comes and the user depresses the shutter key 3, the control circuit 6 determines that the shutter key has been depressed (YES in S216). Then, the control circuit 6 stops displaying the through image and generates a still image based on image data that has been displayed as the through image TN at the time point when the shutter key 3 is depressed (step S217). Unlike the first embodiment, the control circuit 6 records the generated still image data only in the image buffer memory 8 (step S218).

The control circuit 6 displays the template 40 once again on the LCD finder 5 (step S219) and displays a preview image in the N-th display area based on the generated still image data (step S220). Assuming that N=1, a preview image P1 is displayed in the first display area 41-1 in which the through image T1 has been displayed until just before, as shown in FIG. 2D.

The control circuit 6 then determines whether N reaches a value corresponding to the total number of display areas (step S221). If determining that N is not equal to the total number (NO in step S221), the control circuit 6 counts up the counter N (step S222) and repeats the processing from step S214. In this example, the processing from step S214 is repeated by three times until N reaches 3. For example, at the time point when N=2, when the shutter key 3 is depressed by a user after a through image is displayed in the entire screen by the processing of step S215, the preview image P1 is displayed in the first display area 41-1 and, further, preview image P2 is displayed in the second display area 41-2 by the processing of step S220 as shown in FIG. 2F.

Further, at the time point when N=3, when the shutter key 3 is depressed by a user after a through image is displayed on the entire screen by the processing of step S215, the preview images P1 and P2 are displayed in the first and second display areas 41-1 and 41-2 and, further, preview image P3 is displayed in the third display area 41-3 by the processing of step S220 as shown in FIG. 2H.

At the same time, still image data corresponding to the preview image data P1, P2, and P3 are stored only in the image buffer memory 8.

When N reaches a value corresponding to the total number of display areas (YES in step S221), the control circuit 6 generates a layout image data, that is, as shown in FIG. 2H, the control circuit 6 generates layout image data in which preview images P1, P2, and P3 are displayed in the first to third display areas 41-1 to 41-3 on the template 40 (step S223). The generated layout image data is recorded in the still image memory 11 or external memory 16 (step S224).

The control circuit 6 records only the still image data corresponding to the selected preview image in the still image memory 11 or external memory 16 (step S225). That is, the control circuit 6 reads out still image data corresponding to the preview images stored in the image buffer memory 8 in step S218, displays them in a thumbnail view on the LCD finder 5, and records only the still image data selected by a user in the still image memory 11 or external memory 16. Therefore, according to the present embodiment, it is possible to select only the image data that a user needs from the displayed preview images and record it as still image data, enabling an effective use of a memory.

The processing of displaying the through image on the entire screen in step S215 may be effected automatically after a predetermined time period has elapsed since the through image was displayed in a predetermined display area on the template 40. Further, the switching to the state of displaying of the through image on the entire screen may be made only when a user selects, through the operation input section 4, a predetermined display area in which the through image is displayed. In this case, the state where the through image is displayed in a predetermined display area on the template 40 may automatically be recovered after a predetermined time period or may be recovered based on a user's instruction. Thus, the user can confirm not only the details of the through image, but also the entire composition including the through image.

Further, when a user selects a predetermined display area in which the preview image is displayed, the preview image in the selected display area may be displayed on the entire screen. In this case, the state where the preview image is displayed in a predetermined display area on the template 40 may automatically be recovered after a predetermined time period or may be recovered based on a user's instruction. Thus, the user can confirm not only the details of the preview image, but also the entire composition including the preview image.

Further, when selection of a predetermined display area in which a preview image is displayed is canceled by a user, display of the preview image in the canceled display area may be stopped. In this case, a through image may be displayed in the display area in which the display of the preview image has been stopped immediately, or after display of a through image in another display area has been ended. Thus, it is preferable that a preview image that a user has once set can be canceled and that a through image is allowed to be displayed in the display area in which display of the preview image has been canceled for insertion of a new preview image. This configuration makes it easy for a user to create a layout image that fits his or her purpose.

Further, it is preferable that layout image data and still image data to be recorded in the still image memory 11 or external memory 16 have the same specification. For example, when the still image data is recorded at an image size of 10 megabytes, the layout image data is preferable to be recorded at an image size nearly equal to 10 megabytes. Further, if thumbnail image data corresponding to the still image data is added to the still image data, thumbnail image data corresponding to the layout image data is preferable to be added to the layout image data.

Further, when the still image data is recorded in the still image memory 11 or external memory 16 is recorded, layout image data and still image data corresponding to a preview image in the layout image data may be associated with each other. This allows a user to utilize the layout image as, e.g., photographing history of the still image data.

Although the present invention is applied to the digital camera 1 having the configuration shown in FIG. 1, the invention can also be applied to various equipments having an imaging function, such as a mobile phone with camera.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2006-187308 filed on Jul. 7, 2006 and including specification, claims, drawings and summary. The disclosure of the above Japanese Patent Application is incorporated herein by reference in its entirety.

What is claimed is:

1. An imaging device comprising:
   a template storage section which previously stores a template having a plurality of display areas;
   a template readout section which reads out the template from the template storage section;
   an imaging section which images a subject and outputs corresponding image data;
   a display area change section which changes at least one of a size, shape, and position of a display area included in the template read out by the template readout section; and
   a through image display control section which displays a through image corresponding to image data output by the imaging section in one of the display areas included in the template that has been read out by the template readout section and switches in a predetermined order the display area of the through image from one area to another based on an instruction from a user;
   wherein the through image display control section stops displaying the through image when it is determined that no display area remains in which the through image has not yet been displayed.

2. The imaging device according to claim 1, further comprising a still image generation section which generates still image data based on the image data that has been output by the imaging section.

3. The imaging device according to claim 2, further comprising a first recording section which records new still image data in a recording medium after the new still image data is generated by the still image generation section.

4. A through image display control method in an imaging device comprising a template storage section which previously stores a template having a plurality of display areas and an imaging section which images a subject and outputs corresponding image data, the method comprising:
   reading out the template from the template storage section;
   changing at least one of a size, shape, and position of a display area included in the read out template; and
   displaying a through image corresponding to image data output by the imaging section in one of the display areas included in the template that has been read out by the template readout step and switching in a predetermined order the display area of the through image from one area to another based on an instruction from a user;
   wherein the displaying the through image is stopped when it is determined that no display area remains in which the through image has not yet been displayed.

5. A non-transitory computer readable recording medium having a through image display control program stored thereon for controlling a computer to execute functions comprising:
   reading out a template having a plurality of display areas from a storage section;
   changing at least one of a size, shape, and position of a display area included in the read out template; and
   displaying a through image corresponding to image data output by an imaging section in one of the display areas included in the template that has been read out by the template readout function and switching in a predetermined order the display area of the through image from one area to another based on an instruction from a user;
   wherein the displaying the through image is stopped when it is determined that no display area remains in which the through image has not yet been displayed.

* * * * *